United States Patent [19]

Dusch

[11] Patent Number: 5,113,324
[45] Date of Patent: May 12, 1992

[54] SEWING MACHINE WITH A LAMP

[75] Inventor: Albert Dusch, Kaiserslautern, Fed. Rep. of Germany

[73] Assignee: Pfaff Industriemaschinen GmbH, Kaiserslautern, Fed. Rep. of Germany

[21] Appl. No.: 598,734
[22] PCT Filed: Mar. 31, 1989
[86] PCT No.: PCT/EP89/00346
  § 371 Date: Dec. 19, 1990
  § 102(e) Date: Dec. 19, 1990
[87] PCT Pub. No.: WO89/10994
  PCT Pub. Date: Nov. 16, 1989

[30] Foreign Application Priority Data

May 5, 1988 [DE] Fed. Rep. of Germany ... 8805970[U]

[51] Int. Cl.⁵ .............................. D05B 79/00
[52] U.S. Cl. ....................... 362/90; 362/32; 362/33; 362/368
[58] Field of Search .......... 362/26, 32, 90, 368, 362/89, 33, 370, 371, 372

[56] References Cited

U.S. PATENT DOCUMENTS

| | | | |
|---|---|---|---|
| 2,226,689 | 12/1940 | Barber | 362/90 |
| 4,322,781 | 3/1982 | Peterson | 362/32 |
| 4,382,273 | 5/1983 | Jones | 362/368 |
| 4,841,415 | 6/1989 | Dobner | 362/32 |

Primary Examiner—Ira S. Lazarus
Assistant Examiner—Sue Hagaman
Attorney, Agent, or Firm—McGlew & Tuttle

[57] ABSTRACT

A lamp, which has a light source and a fiber-optic light guide that is led, over part of its length, in the housing of a sewing machine, and whose end piece projects from the housing, is to be arranged on the sewing machine such that a desired machine part can be illuminated without the work area and the field of view of the sewing machine operator being disadvantageously affected by the lamp. To achieve this, the end piece of the fiber-optic light guide is adjusted to the shape of a housing part and is received on the housing part, hidden by the side of the housing part facing away from the housing.

7 Claims, 1 Drawing Sheet

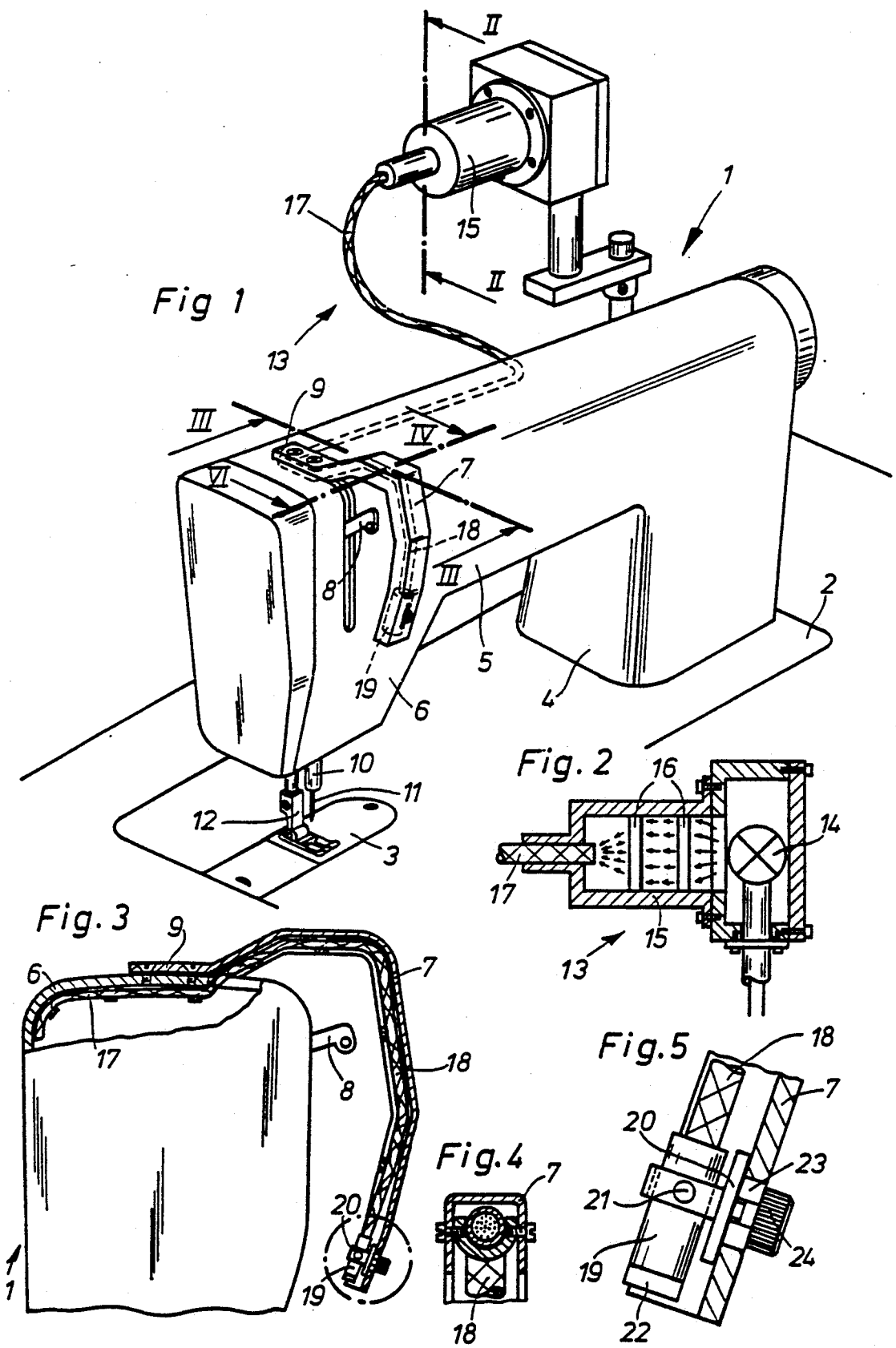

SEWING MACHINE WITH A LAMP

The innovation pertains to a sewing machine according to the introductory part of claim 1.

Such a sewing machine is known from [West] German Utility Patent Specification No. 87,03,621. The lamp has a light source, whose beams are transmitted via fiber-optic light guides. These project from the housing in close proximity of the needle bar on the lower side of the head and illuminate the needle plate.

The fiber-optic light guides considerably reduce the free space under the head, and it cannot be ruled out that the sewing machine operator may move the fiber-optic light guides while guiding a fabric to be sewn, so that they may have to be readjusted.

The basic task of the innovation described in claim 1 is to design the lamp and arrange it on the sewing machine such that any part of the machine can be illuminated without the lamp adversely affecting the work area and the field of view of the sewing machine operator.

This task is accomplished in the device according to the present innovation by the characterizing part of claim 1.

Since the housing part is also intended to receive the lamp, besides its actual purpose, an additional holder, which not only often affects the appearance of the sewing machine disadvantageously, but is also often seen as a nuisance due to reaching into the sewing machine operator's work area, is eliminated.

The covered arrangement of the fiber-optic light guide, as well as the shape of its end piece adapted to the housing part, cause the sewing machine operator to be protected from scattered light and the lamp, as an integral part of the sewing machine, to perform its function without blocking the sewing machine operator's view.

Due to the end piece being able to be adjusted according to claim 2, the position and the sharpness of a light spot imaged on the machine part to be illuminated are adjustable, the position of the light spot can be changed by pivoting the end piece, and the light spot can be focused on the machine part by movements with a vertical component.

The housing part according to claim 3 is particularly suitable for receiving the end piece, because the protective bracket is guided along the head at a distance predetermined by the path of movement of the thread lever. The protective bracket receiving the end piece should be directed at its lower end toward the needle, so that the end of the end piece corresponding to the shape of the protective bracket is inherently oriented toward the needle plate. The swiveling mounting of the end piece now serves only for fine adjustment.

Claim 4 discloses a design measure for adjusting the end piece.

The innovation will be explained on the basis of an embodiment shown in the drawing.

Here,

FIG. 1 shows a schematic diagram of a sewing machine with a lamp,

FIG. 2 shows a section of the lamp along line II—II in FIG. 1,

FIG. 3 shows, partially cut away, the front side of the sewing machine along line III—III in FIG. 1, FIG. 4 shows a section along line IV—IV according to FIG. 1, and FIG. 5 shows an enlarged detail indicated by dash-dotted lines in FIG. 3.

FIG. 1 shows a sewing machine whose housing (1) is formed by a base plate (2) with a needle plate (3), a stand (4), an arm (5), and a head (6). A protective bracket attaching part (7), which covers a thread lever (8) driven in the usual manner, is fastened by a holder (9) on the top side of said head (6). A needle bar (10), which carries the needle (11), and a presser foot device (12) are also mounted in said head (6) in a manner not shown.

Said housing (1) receives a lamp (13), which has a light source (14) (FIG. 2). Said light source (14) is followed by lenses (16) represented in an abstract form, which are arranged in a cylindrical housing (15). On the other side of said lenses (16), a fiber-optic light guide (17) is introduced into said cylindrical housing (15).

Said fiber-optic light guide (17) extends from said cylindrical housing (15) to the sewing machine (FIG. 1), enters said housing (1) on the rear side [of the sewing machine], is led along said arm (5) and said head (6), and exits on the top side of said head (6) behind said holder (9) of said protective bracket attaching part (7). The last piece of said fiber-optic light guide (17), hereinafter called the end piece (18), is fastened to the side of said protective bracket attaching part (7) designed with a U-shaped cross section (FIG. 4), which side faces said housing (1). An illuminating head (19), which is mounted pivoting around pins (21) in a mounting member (20) (FIG. 5) and has a lens (22) for focusing the light beams, is fastened at the free end of said end piece (18). Said mounting member (20) is mounted displaceably in an oblong hole (23) of said protective bracket (7) and can be fixed by means of a setscrew.

The device operates as follows:

The light beams emitted by said light source (14) are focused by said lenses (16) and sent to said fiber-optic light guide (17), which transmits them to said illuminating head (19).

Said fiber-optic light guide (17) is led such that it is not visible on the front side of the sewing machine and does not hinder the sewing machine operator's work.

Said illuminating head (19) is adjusted by pivoting around said pins (21) in order to cast the light beams in the direction of said needle (11). The light beams incident on said needle plate (3) form on same a light spot, which can be focused by displacing said mounting member (20) along said oblong hole (23) after loosening said setscrew (24).

I claim:

1. A sewing machine and lamp arrangement, comprising: a light source and a fiber-optic guide, an end piece of the fiber-optic guide projecting from a housing of the sewing machine, an attaching part mounted on the housing of the sewing machine to project extending spaced away from a surface of the housing of the sewing machine, said end piece being formed to the shape of said housing part and positioned on the attaching part on a side of the attaching part facing said housing.

2. A sewing machine and lamp arrangement according to claim 1, wherein said end piece is arranged adjustably on said attaching part.

3. A sewing machine according to claim 1, wherein said attaching part is formed of a protective bracket, positioned over a thread lever to protect said thread lever.

4. A sewing machine according to claim 3, wherein said protective bracket includes a guide connected to said end piece for moving said end piece.

5. A sewing machine and lamp arrangement, comprising:
- a sewing machine housing having a head end and a side face with a thread lever extending outwardly therefrom;
- a light source;
- a fiber optic guide having one end operably connected to said light source and having an end piece; and
- an attaching part mounted on an upper surface of said sewing machine housing an extending outwardly, above said thread lever and downwardly on a side of said thread lever opposite said sewing machine housing side face and having a lower portion directed toward a stitching site at a base side of said head portion, said fiber optic guide being positioned within said attaching part on a side of said attaching part facing said housing side face.

6. A sewing machine and lamp arrangement according to claim 5, further comprising adjusting means for adjusting the position of said end piece on said attaching part.

7. A sewing machine and lamp arrangement, comprising:
- a sewing machine housing having a head end and a side face with a thread lever extending outwardly therefrom;
- a light source;
- a fiber optic guide having one end operably connected to said light source and having an end piece;
- an attaching part mounted on an upper surface of said sewing machine housing, said housing side face having a housing side face contour including a substantially vertically extending portion and a lower portion angled with respect to said vertically extending portion directed toward a stitching site, said attaching portion being shaped to substantially correspond to said shape of said housing side face, including a substantially horizontally extending portion and an angled portion, said angled portion extending in a direction of said stitching site, said fiber optic guide being positioned within said attaching part on a side of said attaching part facing said housing side face; and
- adjusting means for adjusting the position of said end piece on said attaching part.

* * * * *